C. L. HASTINGS.
ANIMAL COVER.
APPLICATION FILED JAN. 27, 1909.
940,967.
Patented Nov. 23, 1909.
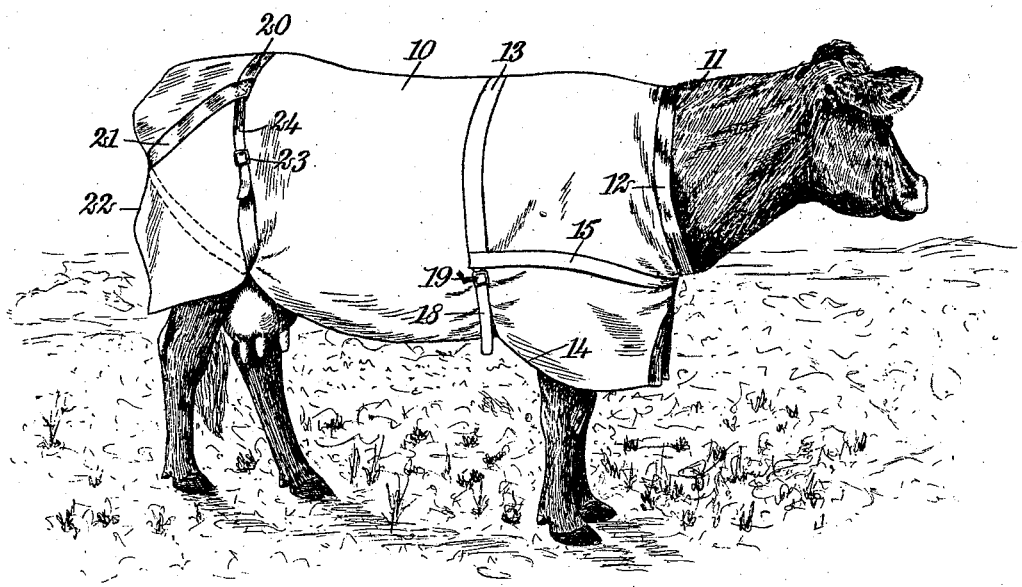
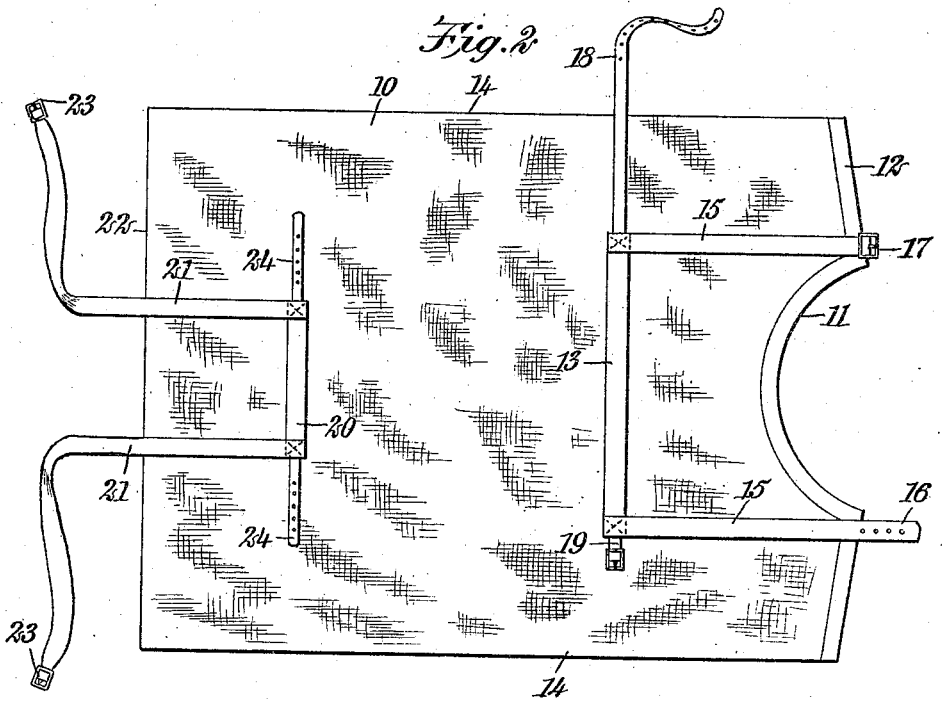
WITNESSES
INVENTOR
Charles L. Hastings
BY
ATTORNEYS

UNITED STATES PATENT OFFICE.

CHARLES LOUIS HASTINGS, OF FOND DU LAC, WISCONSIN.

ANIMAL-COVER.

940,967. Specification of Letters Patent. Patented Nov. 23, 1909.

Application filed January 27, 1909. Serial No. 474,425.

*To all whom it may concern:*

Be it known that I, CHARLES L. HASTINGS, a citizen of the United States, and a resident of Fond du Lac, in the county of Fond du Lac and State of Wisconsin, have invented a new and Improved Animal-Cover, of which the following is a full, clear, and exact description.

This invention relates to covers for animals, such as horses and cattle, and relates more particularly to a cover comprising a blanket adapted to cover the body of the animal, and having means for holding it in position, and hip-bands which are each permanently attached at one end near the rear of the blanket and near the longitudinal center line thereof, so that when the blanket is in position, the points of attachment of the bands are above the hips of the animal, the bands being arranged to pass inside of and around the hind legs of the animal and to be removably secured at their free ends to the blanket, so that the same cannot slip from the back of the animal.

The object of the invention is to provide a simple, inexpensive and durable animal cover, which is particularly useful for cattle, by means of which the animal can be well covered, when necessary, which thoroughly envelops the body of the animal, leaving the head, neck and legs free, and in which means are provided to prevent the displacement of the blanket from the rear of the body.

The invention consists in the construction and combination of parts, to be more fully described hereinafter and particularly set forth in the claim.

Reference is to be had to the accompanying drawings forming a part of this specification, in which similar characters of reference indicate corresponding parts in both views, and in which—

Figure 1 is a perspective view showing an embodiment of my invention as applied to a cow to cover the same; and Fig. 2 is a plan view of the cover, showing the same spread out.

Before proceeding to a more detailed explanation of my invention, it should be clearly understood that the same can be fashioned from any suitable material, such as burlap, blanket-cloth, or other suitable fabric, and is adapted for use on horses, cows and similar animals. I have found that in covers of this kind, unless suitable means are provided for securely holding the blanket at the rear of the body of the animal, the blanket can be very easily displaced by accident, especially through sudden movements of the animal's body, as, for instance, in lying down and getting up. I have found, furthermore, that even when bands or straps are provided for securing the rear of the cover in place upon the body, the blanket can be displaced, unless the hip-bands are attached to the blanket well above the hips, so that they can extend downwardly and inside of the hind legs. In view of this discovery, I have perfected the cover shown in the drawings.

Referring more particularly to the drawings, I provide a blanket or cover-body 10, preferably substantially rectangular in form and having the forward edge recessed or reentrant to form a neck-opening 11. The forward edge is preferably provided with a suitable binding 12.

A shoulder-strap 13 extends transversely of the blanket near the forward part of the same and terminates inwardly of the longitudinal edges 14. Neck-bands 15 extend from the terminals of the shoulder-bands to the forward edge; that is, longitudinally of the blanket. One of the neck-bands has a projecting extremity 16 adapted to be secured at a buckle 17 carried by the forward extremity of the other neck-band. When the blanket is in position upon the body, the neck-bands extend at each side of the shoulders of the animal, and by attaching the end 16 to the buckle 17, the neck-opening 11 is closed under the neck. A surcingle strap 18 is secured at one end of the shoulder-band, and extends laterally beyond the corresponding edge of the blanket. At the other end of the shoulder band is a buckle tab 19, to which the strap 18 can be attached after passing under the belly of the animal, to hold the blanket in place.

Near the rear of the blanket is secured a short transverse back-band 20, substantially parallel to the shoulder-band. Hip-bands 21 extend rearwardly from the terminals of the back-band in the longitudinal direction of the blanket. The hip-bands are permanently attached at the ends to the back-band, and as the latter is short, are thus secured near the longitudinal center line of the blanket. They extend rearwardly beyond the rear edge 22 of the blanket and terminate in buckles 23. The back-band has tabs 24 at the ends, which extend in the direction of its length and are adapted to have the buckles 23 attached thereto in the customary manner. The hipbands pass rearwardly downward, and then inside of the hind legs to the outside of the blanket, being then upwardly disposed to their points of attachment with the tabs 24, as is shown most clearly in Fig. 1. It will be seen that the hip-bands, when the blanket is in place upon the body, thus extend from points above the animal's hips, and thus practically obviate the possibility of having the blanket slip from the hips.

Having thus described my invention, I claim as new and desire to secure by Letters Patent:—

An animal cover, comprising a blanket having a short back-band extending transversely of said blanket, hip-bands secured at the terminals of said back-band and extending longitudinally of said blanket, said hip-bands being adapted to pass inside of the hind legs of the animal, said back band having tabs at the ends extending in the direction of the length of said back-band, each of said hip-bands having a buckle for removably attaching to one of said tabs.

In testimony whereof I have signed my name to this specification in the presence of two subscribing witnesses.

CHARLES LOUIS HASTINGS.

Witnesses:
M. T. SIMMONS,
E. J. SHAW.